United States Patent
Colino Vega

(10) Patent No.: US 10,480,202 B1
(45) Date of Patent: Nov. 19, 2019

(54) VERTICAL FORMWORK WITH TIE ROD AND TIE ROD ANCHOR

(71) Applicant: ULMA C y E, S. Coop., Oñati (ES)

(72) Inventor: Manuel Colino Vega, Vitoria-Gasteiz (ES)

(73) Assignee: ULMA C Y E, S. COOP., Oñati (ES)

( * ) Notice: Subject to any disclaimer, the term of this patent is extended or adjusted under 35 U.S.C. 154(b) by 0 days.

(21) Appl. No.: 16/431,080

(22) Filed: Jun. 4, 2019

(30) Foreign Application Priority Data

Jun. 22, 2018 (EP) .................................... 18382460

(51) Int. Cl.
*E04G 17/06* (2006.01)
*E04G 17/065* (2006.01)
*E04G 11/06* (2006.01)

(52) U.S. Cl.
CPC .......... *E04G 17/0657* (2013.01); *E04G 11/06* (2013.01); *E04G 17/0652* (2013.01)

(58) Field of Classification Search
CPC . E04G 17/0652; E04G 17/0657; E04G 17/06; F16B 21/02
USPC ............................................. 249/40, 42, 43
See application file for complete search history.

(56) References Cited

U.S. PATENT DOCUMENTS

| | | | | |
|---|---|---|---|---|
| 8,220,772 | B2* | 7/2012 | Schwoerer | E04G 17/0657 249/216 |
| 9,580,922 | B2* | 2/2017 | Hagemes | E04G 17/0652 |
| 9,803,383 | B2 | 10/2017 | Amon | |
| 2004/0079860 | A1* | 4/2004 | Ward | E04G 17/045 249/33 |
| 2008/0173788 | A1* | 7/2008 | Brewka | E04G 11/10 249/189 |
| 2012/0304570 | A1* | 12/2012 | Braun | E04G 17/06 52/426 |
| 2014/0374568 | A1* | 12/2014 | Amon | E04G 17/0652 249/1 |
| 2015/0167329 | A1* | 6/2015 | Hagemes | E04G 17/0652 52/745.21 |

(Continued)

FOREIGN PATENT DOCUMENTS

EP 1541781 A1 6/2005
WO 2016026812 A1 2/2016
(Continued)

OTHER PUBLICATIONS

Extended European Search Report in corresponding European Application No. 18382460.6, dated Sep. 25, 2018, 9 pages.

*Primary Examiner* — Michael Safavi
(74) *Attorney, Agent, or Firm* — Edell, Shapiro & Finnan, LLC

(57) ABSTRACT

According to one embodiment a vertical formwork is provided that includes at least a front formwork panel and a rear formwork panel facing one another, a threaded tie rod, a spacing tube, a front anchor, and a rear anchor. The front anchor includes a nut and a stop element passed through by the tie rod arranged between the spacing tube and the nut, the stop element acting as a stop of the spacing tube in the final assembly position. The stop element is a tube capable of swiveling in the housing together with the tie rod during assembly and does not directly abut with the front formwork panel when it reaches the final assembly position, such that the stop element cannot move beyond its final assembly position.

20 Claims, 6 Drawing Sheets

(56) References Cited

U.S. PATENT DOCUMENTS

2017/0002575 A1* 1/2017 Dingler .................. E04G 17/14
2018/0320393 A1 11/2018 Dingler et al.

FOREIGN PATENT DOCUMENTS

| WO | 2017216355 A1 | 12/2017 |
| WO | 2018137728 A1 | 8/2018 |

* cited by examiner

VERTICAL FORMWORK WITH TIE ROD AND TIE ROD ANCHOR

CROSS-REFERENCE TO RELATED APPLICATIONS

This application relates to and claims the benefit and priority to European Application No. EP18382460.6, filed Jun. 22, 2018.

TECHNICAL FIELD

The present invention relates to vertical formworks.

BACKGROUND

The use of vertical formworks for building vertical structures, such as walls for example, is known.

A vertical formwork comprises a front formwork panel and a rear formwork panel arranged facing one another. Both formwork panels are fixed to one another by means of a tie rod, a front anchor fixed to the front formwork panel and to a first end of the tie rod, and a rear anchor fixed to the rear formwork panel and to a second end of the tie rod.

WO2016/026812A1 describes a vertical formwork configured for being adjusted from one face, i.e., a vertical formwork which is fixed by a single operator from the side of the front formwork panel.

The front anchor described in WO2016/026812A1 comprises a nut configured for being screwed onto a first end of the tie rod, and a sleeve configured for being introduced in a through housing of the front formwork panel. The sleeve has a truncated cone shaped through hole configured to be passed through by the tie rod, and which allows the tie rod to swivel inside the sleeve. The front formwork panel further comprises fixing means configured for fixing the sleeve to the front formwork panel.

The vertical formwork further comprises a spacing tube passed through by the tie rod, and which is arranged between both formwork panels in the final assembly position. The spacing tube comprises a conical-shaped sealing element at each of its ends which prevents the concrete from leaking into the sleeve once the concrete has been poured between both formwork panels.

The vertical formwork described in WO2016/026812A1 allows the adjusting thereof from a face, for which purpose the operator positions himself facing the front formwork panel and introduces the threaded tie rod through the through housing of the front formwork panel. The spacing tube comprising a conical-shaped sealing element at each of its ends, the sleeve and the nut, are arranged in that order on the tie rod. The operator introduces all the elements and fixes the sleeve to the front formwork panel by means of using the fixing means. The operator then screws the tie rod onto the rear anchor, and finally screws the nut of the front anchor on to fix the tie rod to the front formwork panel. The sleeve acts as a stop element of the spacing tube in the final assembly position.

SUMMARY

Vertical formworks are disclosed that comprise at least a front formwork panel and a rear formwork panel arranged facing one another, a threaded tie rod which is fixed to both formwork panels in a final assembly position of the vertical formwork, a spacing tube crossed by the tie rod which is arranged between both formwork panels in the final assembly position, a front anchor which fixes the tie rod to the front formwork panel in the final assembly position, and a rear anchor which fixes the tie rod to the rear formwork panel in the final assembly position.

The front anchor of the vertical formwork comprises a nut configured for being screwed onto a first end of the tie rod, and a stop element passed through by the tie rod and which is arranged between the spacing tube and the nut, the stop element acting as a stop of the spacing tube when it is arranged in a final assembly position corresponding to the final assembly position of the vertical formwork. The vertical formwork is configured for being assembled by means of introducing the tie rod, together with the spacing tube and the stop element, through a through housing of the front formwork panel so as to fix the second end of the tie rod to the rear anchor previously placed in the rear formwork panel, the front anchor then being fixed to the front formwork panel, where the tie rod can swivel in the housing during assembly.

The stop element is a tube swiveling in the housing together with the tie rod during assembly and indirectly abutting with the front formwork panel when it reaches the final assembly position, such that the stop element cannot move beyond its final assembly position.

The process of adjusting the formwork from one face makes the assembly of the formwork simpler. In the vertical formwork described in WO2016/026812A1, the stop element is a sleeve that has to be fixed to the front formwork panel. In the vertical formworks disclosed herein, since the stop element is a tube indirectly abutting with the front formwork panel when it reaches the final assembly position, it is not necessary to fix the stop element to the front formwork panel, whereby that step is dispensed with during assembly. Furthermore, the front formwork panel of the vertical formwork is simpler than the front formwork panel of the vertical formwork of WO2016/026812A1, given that the front formwork panel does not comprise fixing means for fixing the stop element to the front formwork panel.

These and other advantages and features will become evident in view of the drawings and the detailed description.

DETAILED DESCRIPTION

FIGS. 1 to 7 show a first embodiment of a vertical formwork 1.

Figure 1:
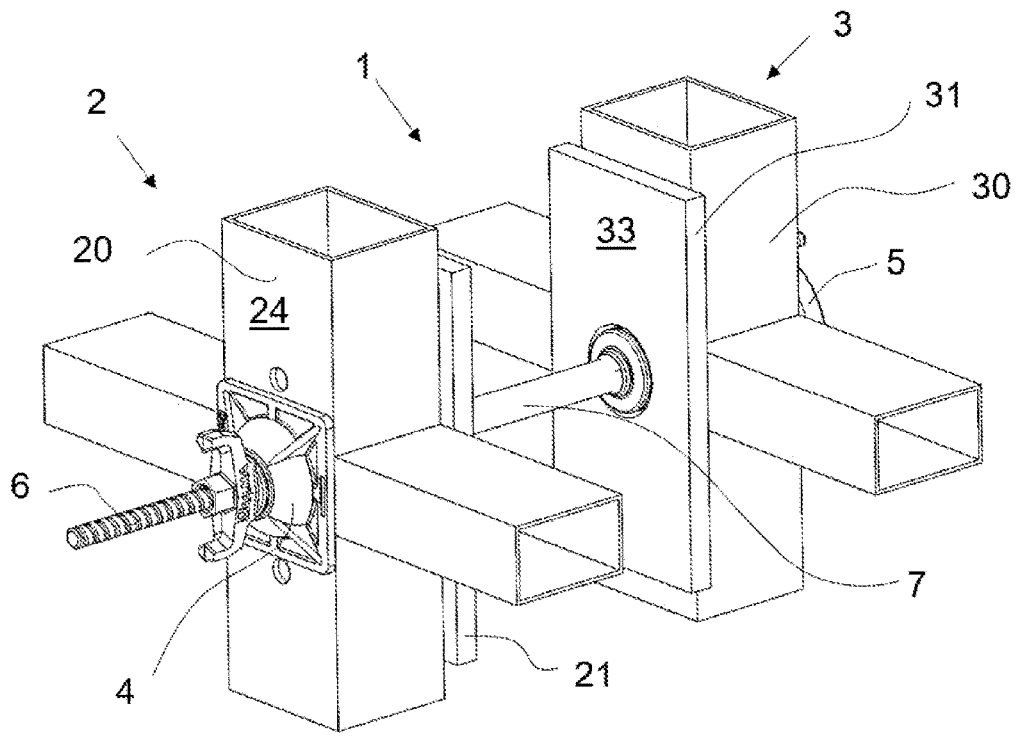
FIG. 1 shows a perspective view of an embodiment of a vertical formwork seen from the side of the operator.
Figure 2:
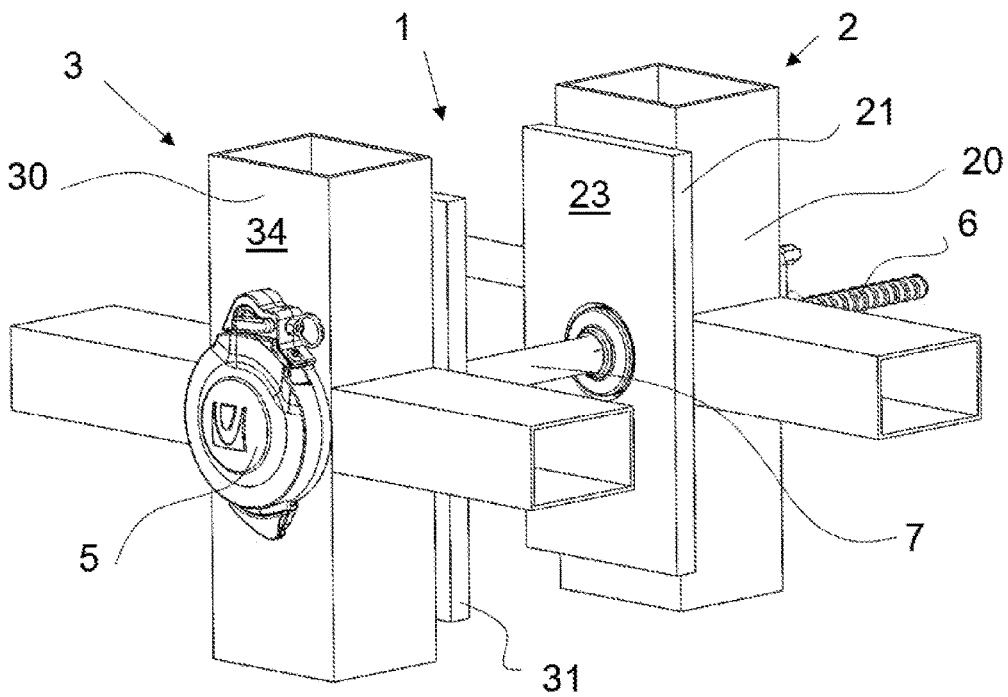
FIG. 2 shows a perspective view of an embodiment of the vertical formwork of FIG. 1 from the side opposite the operator.
Figure 3:
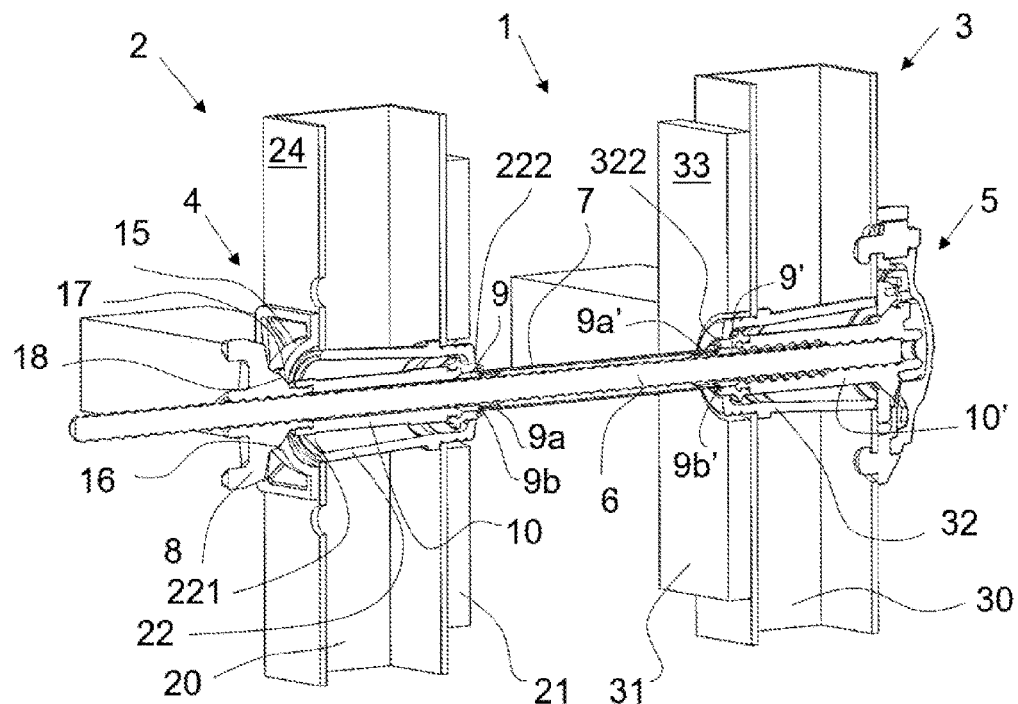
FIG. 3 shows a perspective section view of the vertical formwork of FIG. 1.

As shown in FIGS. 1 to 3, the vertical formwork 1 comprises at least a front formwork panel 2 and a rear formwork panel 3 arranged facing one another, a threaded tie rod 6 which is fixed to both formwork panels 2 and 3 in a final assembly position of the vertical formwork 1, a spacing tube 7 through which the tie rod 6 passes and which is arranged between both formwork panels 2 and 3 in the final assembly position, and anchors 4 and 5 which fix the tie rod 6 to formwork panels 2 and 3, respectively, in the final assembly position. Therefore, in the final assembly position the vertical formwork 1 is assembled and prepared for the concrete to be poured between both formwork panels 2 and 3.

According to some embodiments, both formwork panels can be identical. Each of the formwork panels 2 and 3 comprises a structure 20 and 30, a board 21 and 31 fixed to the structure 20 and 30, and a housing 22 and 32 going through the structure 20 and 30 and the board 21 and 31. Preferably, the board 21 and 31 is made of wood and the structure 20 and 30 and the housing 22 and 32 are metallic. For the sake of clarity, the formwork panels 2 and 3 are only partially depicted in the drawings.

The vertical formwork 1 is configured for being adjusted from one face, i.e., the tie rod 6 is fixed from one side of the formwork. In systems of this type, one of the anchors is fixed to one of the formwork panels before positioning the formwork panels 2 and 3 facing one another. Once the formwork panels 2 and 3 have been positioned, the operator positions himself facing the other formwork panel and fixes the other anchor to the other formwork panel. To understand this patent document, the front part shall be considered the part where the operator fixing the tie rod 6 positions himself. Therefore, front formwork panel 2 shall be referred to as the formwork panel arranged on the operator side and rear formwork panel 3 shall be referred to as the formwork panel opposite the front formwork panel 2. Likewise, front anchor 4 shall be referred to as the anchor fixed to the front formwork panel 2, and rear anchor 5 shall be referred to as the anchor fixed to the rear formwork panel 3. Furthermore, inner face 23 and 33 of the formwork panel 2 and 3 shall be considered the face suitable for being arranged in contact with the concrete, and outer face 24 and 34 of the formwork panel 2 and 3 shall be considered the face opposite the inner face 23 and 33.

The tie rods that have conventionally been the most widely used in conventional vertical formworks adjusted from two faces have been Dywidag® 15 ties and Dywidag® 20 ties, with one or the other being selected depending on the maximum tensile load the vertical formwork has to withstand. A vertical formwork for being adjusted from two faces comprises two formwork panels arranged facing and fixed to one another by means of a tie rod (usually a Dywidag® 15 tie or a Dywidag® 20 tie), the tie rod being fixed to the formwork panels by means of an anchor fixed to the respective formwork panel. A spacing tube generally made of plastic is arranged between the formwork panels so as to enable removing the tie rod once the concrete has cured. In vertical formworks of this type, there has to be an operator on each side of the formwork to enable assembling the formwork. The vertical formwork 1 is configured for being adjusted from one face and fixing the front and rear formwork panels 2 and 3 by means of a tie rod 6, such as a Dywidag® 15 threaded tie or a Dywidag® 20 threaded tie.

Figure 4:
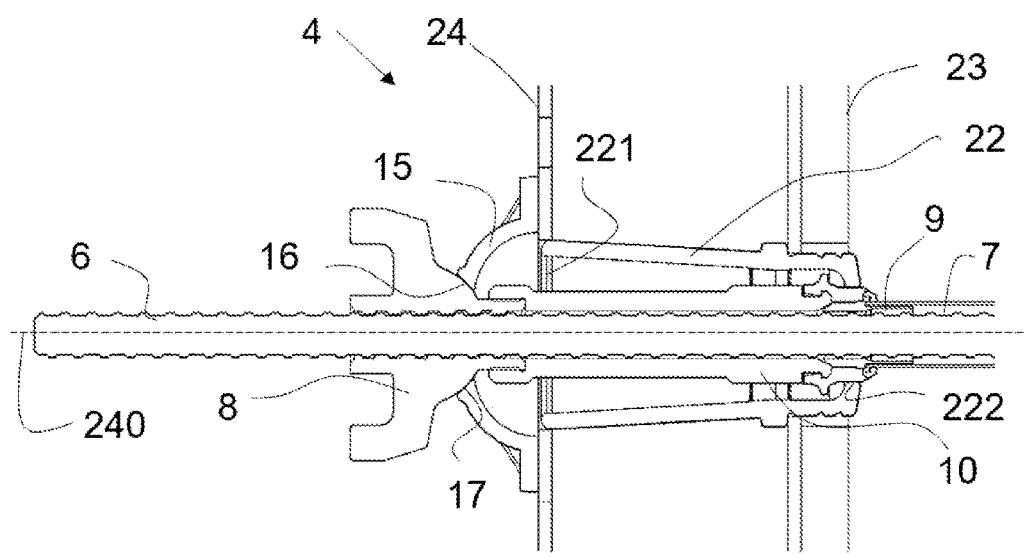
FIG. 4 shows a section view of the front anchor of the vertical formwork of FIG. 1.

In this embodiment, the front formwork panel 2, shown in detail in FIG. 4, comprises a through hole extending from the outer face 24 to the inner face 23. The housing 22 of the front formwork panel 2 is arranged in the hole. Part of the front anchor 4 is housed in the housing 22. The housing 22 has an entry opening 221 which is arranged at the same level as the outer face 24 of the front formwork panel 2 and an exit opening 222 which is arranged at the same level as the inner face 23 of the front formwork panel 2, the diameter of the exit opening 222 being smaller than the diameter of the entry opening 221. The through housing has a central longitudinal axis 240 that passes through the center of the entry and exit openings 221 and 222. The configuration of the rear formwork panel 3 may be the same as the configuration of the front formwork panel 2.

In other embodiments, each formwork panel may comprise a plurality of holes, depending on the dimensions of the formwork panel, a housing and a respective anchor being arranged in each of them, such that two facing formwork panels can be fixed to one another through a plurality of tie rods fixed to the anchors.

Figure 5:
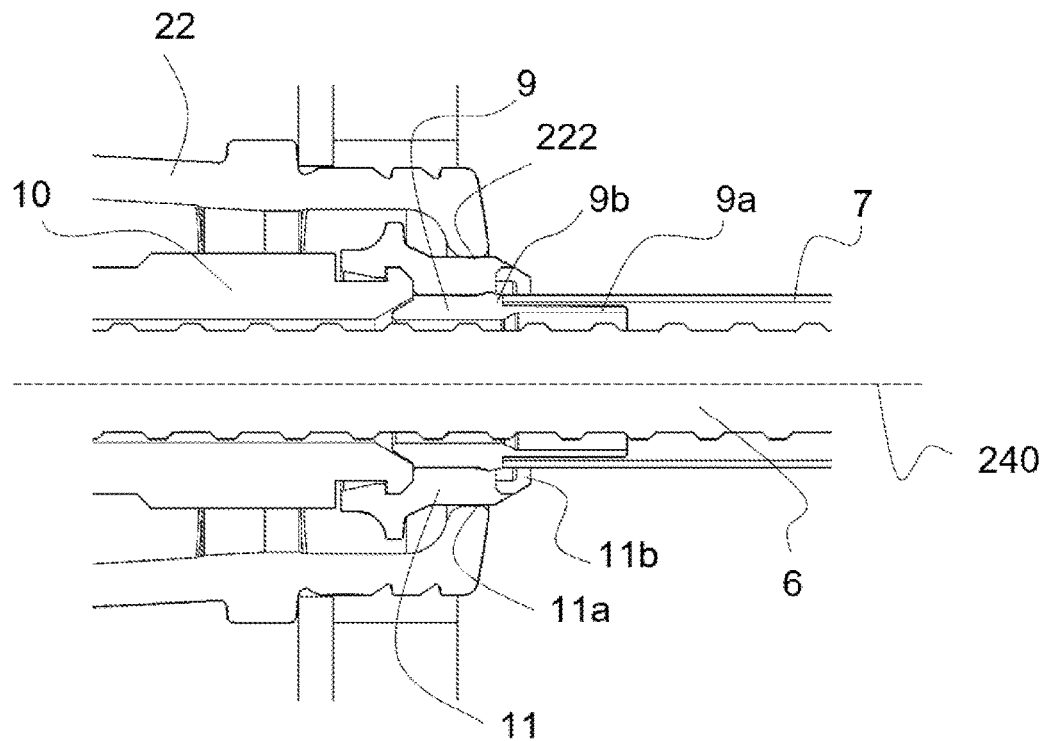
FIG. 5 shows a detail of the front anchor of the vertical formwork of FIG. 1.
Figure 6:
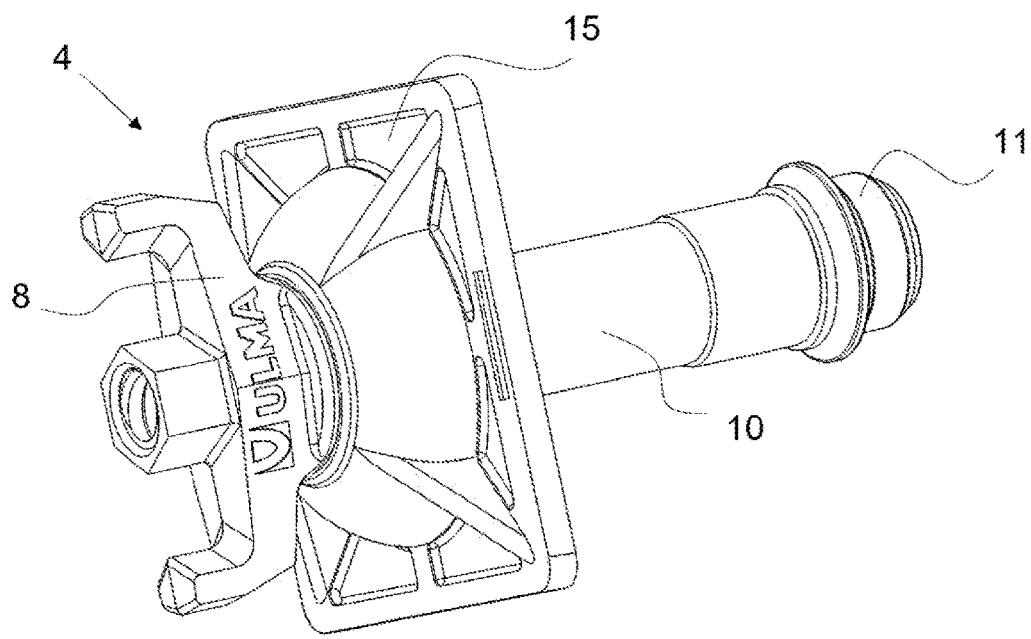
FIG. 6 shows a perspective view of the front anchor of the vertical formwork of FIG. 1.

The front anchor 4 of the vertical formwork 1 comprises a nut 8 configured for being screwed onto a first end of the tie rod 6, and a stop element 10 passed through by the tie rod 6 and which is arranged between the spacing tube 7 and the nut 8, the stop element 10 acting as a stop of the spacing tube 7 when it is arranged in a final assembly position corresponding to the final assembly position of the vertical formwork 1, as can be observed in FIGS. 4 and 5. As seen in FIGS. 4 and 5, according to one embodiment when the vertical formwork is in an assembled state, each of the tie rod 6 and stop element 10 has a central longitudinal axis that is the same as central longitudinal axis 240. However, the tie rod 6, stop element 10 and through housing 22 are configured to permit a swiveling of the tie rod 6 and stop element 10 inside the through opening of the housing during the assembly of the vertical formwork and to permit the central longitudinal axis of each of the tie rod and stop element to be non-concentric or non-parallel to the central longitudinal axis 240 of the through housing 22 when the front anchor is attached to the front formwork panel in the final assembly position of the vertical formwork.

The vertical formwork 1 of the invention is configured for being assembled by means of introducing the tie rod 6, together with the spacing tube 7 and the stop element 10, through a through housing 22 of the front formwork panel 2 so as to fix the second end of the tie rod 6 to the rear anchor 5 previously placed in the rear formwork panel 3, the front anchor 4 then being fixed to the front formwork panel 2, where the tie rod 6 can swivel in the housing 22 during assembly.

The tie rod 6 of the vertical formwork 1 of this embodiment can swivel during assembly of the vertical formwork 1, which allows the tie rod 6 to not necessarily be positioned in a manner that is completely perpendicular to both formwork panels 2 and 3 once it has been fixed to both formwork panels 2 and 3, but rather it can take a certain angle of inclination with respect to said perpendicular. This allows enabling the tie rod 6 to be readily fixed to both formwork panels 2 and 3 even when the exit opening 222 of the housing 22 of the front formwork panel 2 is not arranged completely aligned with the exit opening 322 of the housing 32 of the rear formwork panel 3 forming a 90° angle with respect to the inner faces 23 and 33 of the formwork panels 2 and 3.

As can be observed in the drawings, the stop element 10 of the front anchor 4 of the vertical formwork 1 is a tube which swivels in the housing 22 together with the tie rod 6 during assembly, i.e., the tie rod 6 is housed in the stop element 10 with little clearance. The stop element 10 abuts indirectly with the front formwork panel 2 when it reaches the final assembly position, such that the stop element 10 cannot move beyond its final assembly position. Since the stop element 10 is a tube indirectly abutting with the front formwork panel when it is arranged in the final assembly position, it is not necessary to fix the stop element 10 to the front formwork panel 2, whereby that step is dispensed with during assembly.

The vertical formwork 1 of this embodiment comprises an intermediate bushing 9 passed through by the tie rod 6 and which is arranged between the stop element 10 and the spacing tube 7. FIG. 5 shows the intermediate bushing 9, comprising at one end a section 9a which is housed in the spacing tube 7 and a perimetral ring 9b after said section 9a, the spacing tube 7 being supported on a supporting surface of the perimetral ring 9b. The other end of the intermediate bushing 9 is supported on the stop element 10.

In the vertical formwork 1 of this embodiment, the intermediate bushing 9 has a maximum outer diameter equal to or less than the outer diameter of the stop element 10, the intermediate bushing 9 preferably being substantially cylindrical along its entire length.

In the vertical formwork 1 of this embodiment, the stop element 10 comprises a sealing gasket 11 at its end adjacent to the spacing tube 7. As described above, the housing 22 of the front formwork panel 2 comprises an exit opening 222. The sealing gasket 11 comprises a contour 11a configured for sealing the exit opening 222 in the final assembly position. Furthermore, the sealing gasket 11 preferably comprises an annular portion 11b configured for sealing the spacing tube 7.

The sealing means of vertical formworks are elements that degrade with use, and for that reason they usually have to be changed. The fact that the sealing gasket 11 is arranged in the front anchor 4 and not in the front formwork panel 2 makes replacement thereof easier, given that the front anchor 4 is more manageable than the front formwork panel 2 in terms of both dimensions and weight. Furthermore, deterioration of the sealing gasket 11 due to abrasion when cleaning the front formwork panel 2 with wire brushes to remove concrete residues that may be left after use of the front formwork panel 2 is prevented. Not arranging the sealing gasket 11 in the front formwork panel 2 makes it easier to assemble the vertical formwork 1, improving visibility of the rear formwork panel 3 through the exit opening 222 of the housing 22. During the assembly process, when the tie rod 6 is introduced through the front formwork panel in order to fix it to the rear formwork panel 3, the sealing gasket 11 has not yet been introduced in the front formwork panel 2, therefore there is no sealing element arranged in the exit opening 222 that reduces visibility through same.

Furthermore, using the sealing gasket 11 prevents using sealing cones arranged on both sides of the spacing tube 7. In vertical formworks using a standard Dywidag® 15 or Dywidag® 20 tie, a sealing cone was conventionally arranged on each side of the spacing tube located between both formwork panels. The sealing cones prevented concrete from filtering into the front and rear anchors. In the vertical formwork 1, the sealing function is carried out solely by the sealing gasket 11, thereby obviating the use of any other sealing means. In the vertical formwork 1, both the attachment existing between the spacing tube 7 and the sealing gasket 11 as well as the attachment existing between the housing 22 and the sealing gasket 11 are successfully sealed with a single sealing gasket 11 so that there are no concrete leakages.

In the vertical formwork 1, the sealing quality obtained by means of using the sealing element 11 is higher than the sealing quality obtained in the vertical formworks of the state of the art. This is possible because the sealing element 11, the stop element 10, and the tie rod 6 are aligned with one another, allowing the sealing element 11 to be positioned with the same angle of inclination as the tie rod 6 with respect to the inner face 23 of the front formwork panel 2, even still thereby assuring a good seal due to the adaptability of the sealing element 11 to the exit opening 222 of the housing 22.

In the vertical formwork 1 of this embodiment, the front anchor 4 comprises a dome plate 15 configured for fixing the tie rod 6 to the front formwork panel 2, the dome plate 15 comprising a through hole 16 delimited by a curved supporting surface 17, and the nut 8 comprising a curved complementary surface 18 configured for cooperating with the supporting surface 17 of the dome plate 15 like a ball and socket joint.

The vertical formwork 1 may be configured for using a standard dome plate and nut assembly. Likewise, the vertical formwork 1 may be configured for using a standard Dywidag® 15 or Dywidag® 20 threaded tie. The vertical formwork 1 is a vertical formwork configured for being adjusted from one face, where the tie rod 6 can swivel during assembly of the vertical formwork 1, and it uses both a standard dome plate and nut assembly, as well as a standard threaded tie, both of which are well-known in the prior art.

Figure 7:
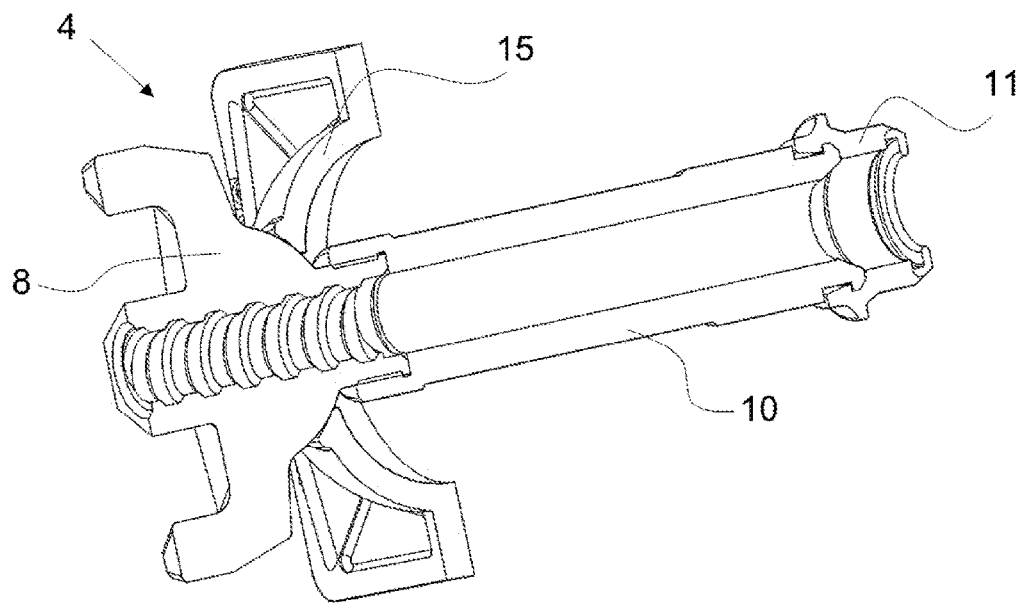
FIG. 7 shows a perspective section view of the front anchor of the vertical formwork of FIG. 1.

In the vertical formwork 1 of this embodiment, the stop element 10 is attached to the nut 8 of the front anchor 4, as can be observed in FIG. 7. More specifically, in this embodiment the stop element 10 comprises an inner thread and the nut 8 comprises an outer thread, both being attached by means of threading, where the attachment can be reinforced by means of an adhesive.

In this embodiment, the outer diameter of the stop element 10 is greater than the inner diameter of the through hole 16 of the dome plate 15. The fact that the outer diameter of the stop element 10 is greater than the inner diameter of the through hole 16 of the dome plate 15, along with the fact that the stop element 10 is attached to the nut 8, allows the assembly formed by the nut 8 and the stop element 10 to not be released from the dome plate 15 and therefore enables being handled like a single element, which minimizes the number of elements to be dealt with during assembly of the vertical formwork 1, at the same time making the assembly easier.

In an alternative embodiment with respect to this embodiment 1, which is not shown in the drawings, the nut 8 of the front anchor 4 and the stop element 10 are a single piece.

In the vertical formwork 1, the stop element 10 abuts indirectly with the front formwork panel 2 when it reaches the final assembly position, such that the stop element 10 cannot move beyond its final assembly position. In the embodiment of the vertical formwork 1 shown in FIGS. 1 to 7, in the final assembly position the stop element 10 abuts with the front formwork panel 2 through the dome plate 15. During assembly of the vertical formwork 1, the tie rod 6, together with the spacing tube 7 and the stop element 10, is introduced through the through housing 22 of the front formwork panel 2 so as to fix the second end of the tie rod 6 to the rear anchor 5 previously placed in the rear formwork panel 3, the front anchor 4 then being fixed to the front formwork panel 2 by means of the nut 8. Once the front anchor 4 has been fixed, the final assembly position is reached, in which position the sealing gasket 11 is arranged in the exit opening 222 of the housing 22, and the stop element 10 is arranged in the housing 22, where the stop element 10 cannot go beyond the exit opening 222 of the housing 22 as this is prevented by the nut 8, attached to the stop element 10 itself, and abutting with the dome plate 15, which in turn abuts with the outer face 24 of the front formwork panel 2 in the final assembly position.

Figure 8:
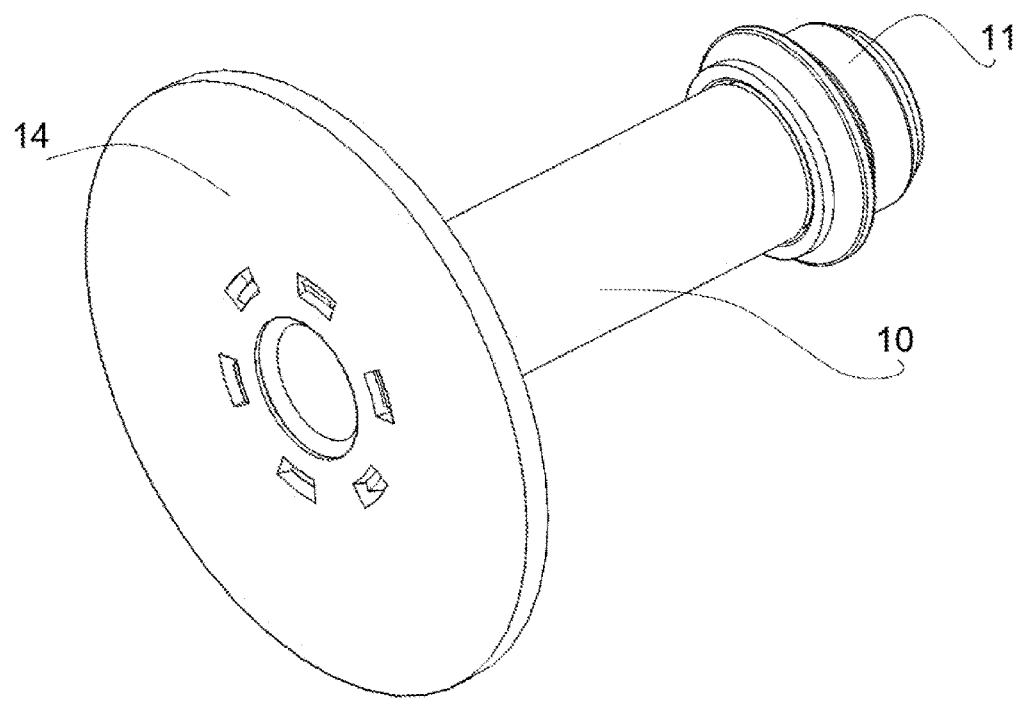
FIG. 8 shows part of the front anchor of a second embodiment of the vertical formwork.
Figure 9:
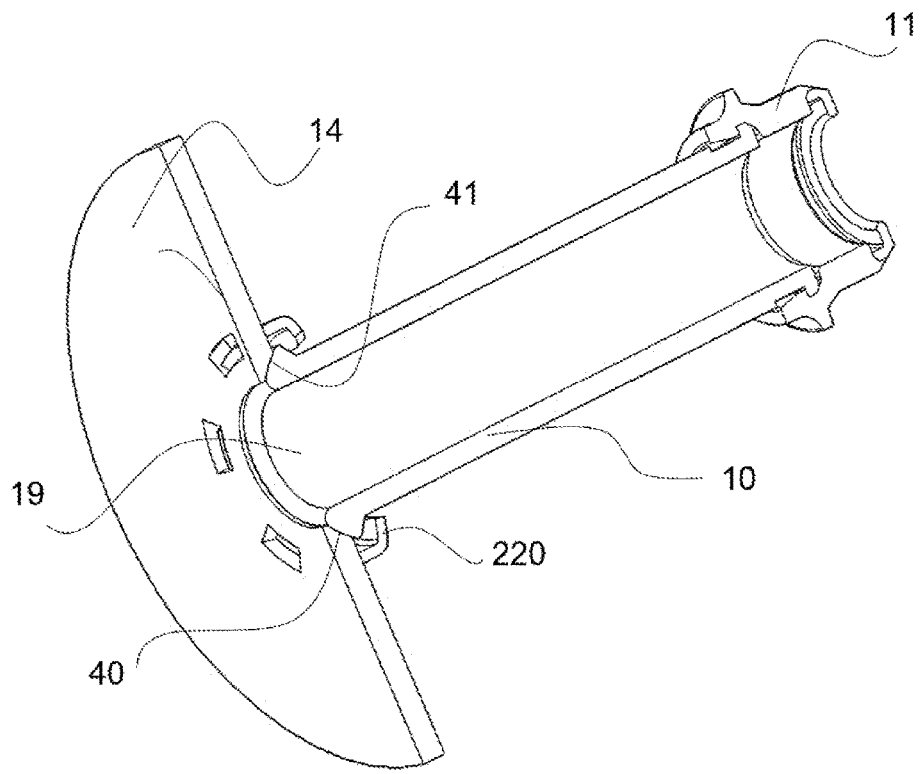
FIG. 9 shows a perspective section view of the part of the front anchor of FIG. 8.
Figure 10:
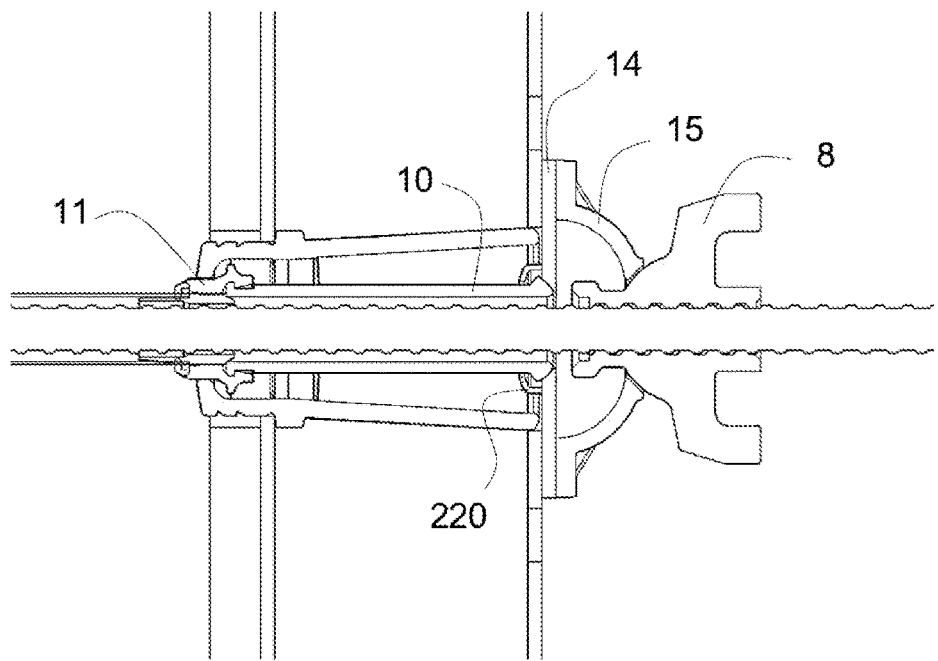
FIG. 10 shows the front anchor of the second embodiment of the vertical formwork.

FIGS. 8 to 10 show a second embodiment of the vertical formwork 1. Many of the features of this second embodiment coincide with the features of the first embodiment, so they will not be explained again. In the vertical formwork 1 of the second embodiment, the stop element 10 is attached to a stop plate 14 at its end adjacent to the nut 8 of the front anchor 4. The stop plate 14 is configured for being supported on the front formwork panel 2 in the final assembly position. The stop plate 14 is attached to the stop element 10 preferably in a swiveling manner.

In the vertical formwork 1 of the second embodiment, the stop plate 14 comprises a through hole 19 configured to be passed through by the tie rod 6 and a curved supporting surface 40 surrounding the through hole 19. The stop element 10 comprises a contact surface 41 at its end adjacent to the nut 8 configured for cooperating with the supporting surface 40 of the stop plate 14 like a ball and socket joint.

In this second embodiment, the supporting surface 40 and the contact surface 41 have a truncated cone shape. In order for both surfaces to cooperate, the angle of inclination of the contact surface 41 with respect to the surface of the stop plate 14 will be greater than the angle of inclination of the supporting surface 40 with respect to the surface of the stop plate 14. In an alternative embodiment, the supporting surface 40 and the contact surface 41 can have a spherical shape. In another alternative embodiment, the supporting surface 40 can have a truncated cone shape, and the contact surface 41 can have a spherical shape. Likewise, in another alternative embodiment, the supporting surface 40 can have a spherical shape, and the contact surface 41 can have a truncated cone shape. In order for both surfaces to cooperate with one another like a ball and socket joint, any of the four configurations described above for both surfaces is possible.

In the vertical formwork 1 of the second embodiment, the stop plate 14 comprises a housing bushing 220 that is passed through by the stop element 10 and which delimits, together with the stop plate 14, a cavity in which the widened section of the stop element 10 is confined.

In the vertical formwork 1 of the second embodiment, the stop element 10 abuts with the front formwork panel 2 in the final assembly position through the stop plate 14. During assembly of the vertical formwork 1, the tie rod 6, together with the spacing tube 7 and the stop element 10, is introduced through the through housing 22 of the front formwork panel 2 so as to fix the second end of the tie rod 6 to the rear anchor 5 previously placed in the rear formwork panel 3, the front anchor 4 then being fixed to the front formwork panel 2 by means of the nut 8. Once the front anchor 4 has been fixed, the final assembly position is reached, in which position the sealing gasket 11 is arranged in the exit opening 222 of the housing 22, and the stop element 10 is arranged in the housing 21, where the stop element 10 cannot go beyond the exit opening 222 of the housing 22 as this is prevented by the stop plate 14, attached in a swiveling manner to the stop element 10 itself, abutting with the outer face 24 of the front formwork panel 2 in the final assembly position. In the final assembly position, the nut 8 abuts with the dome plate 15, which in turn fixes the stop plate 14 against the outer face 24 of the front formwork panel 2.

Figure 11:
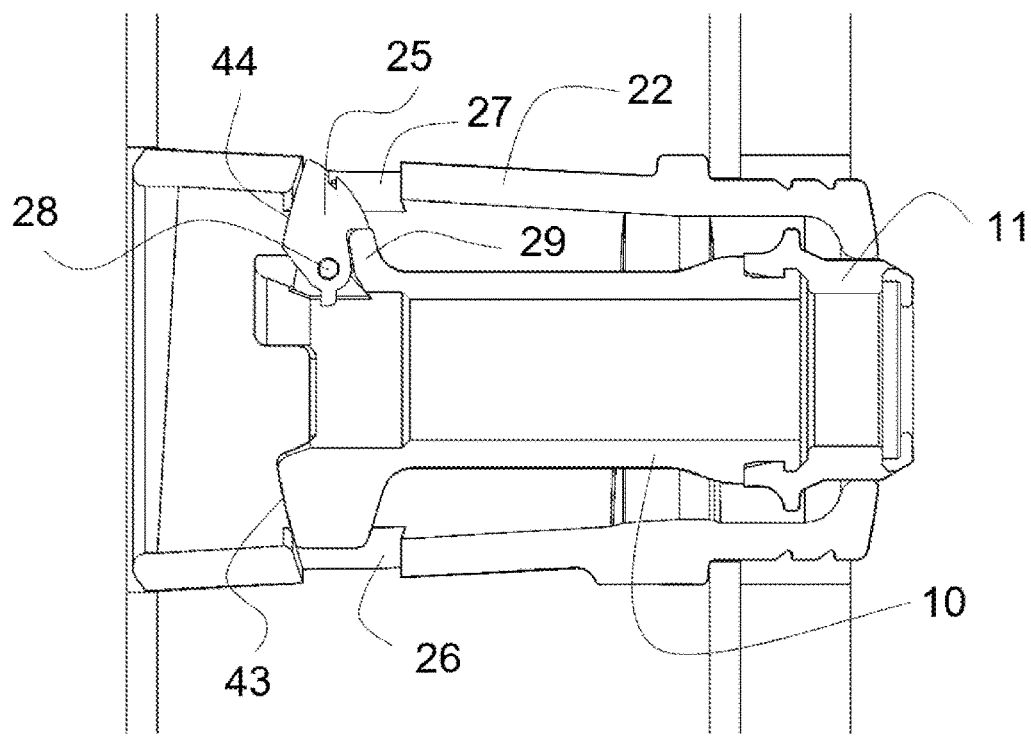
FIG. 11 shows a section view of the part of the front anchor of a third embodiment of the vertical formwork.
Figure 12:
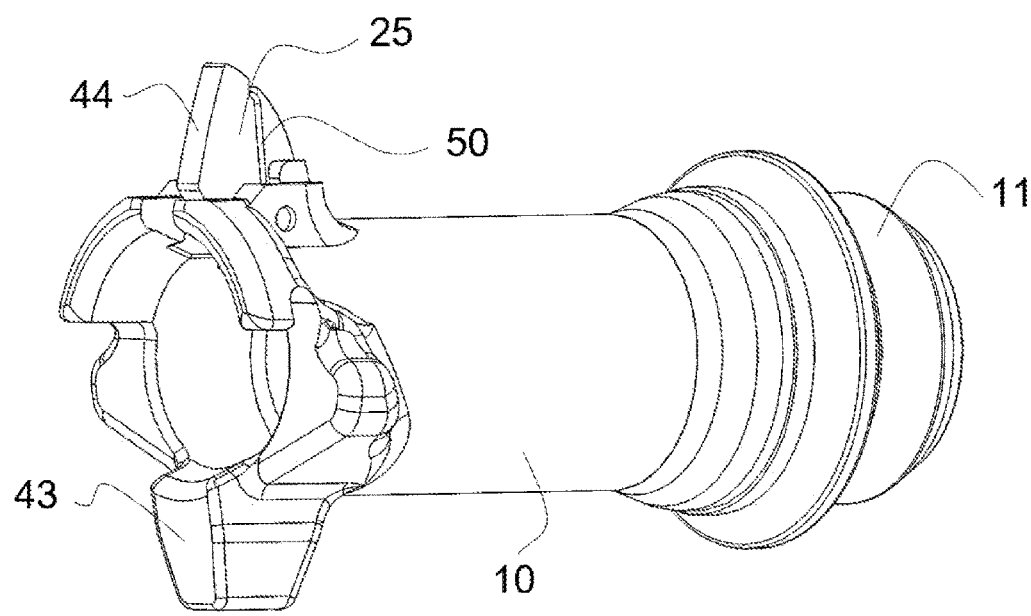
FIG. 12 shows the part of the front anchor of FIG. 11.

FIGS. 11 and 12 show a third embodiment of the vertical formwork 1. Many of the features of this third embodiment coincide with the features of the first embodiment, so they will not be explained again. In the vertical formwork 1 of the third embodiment, the stop element 10 is attached to a first stop 43 in the form of a radial extension and to a second stop 44 comprising a pre-stressed flange 25, the housing 22 comprising respective holes 26 and 27 in which the first stop 23 and the second stop 24 are housed during assembly.

The pre-stressed flange 25 is attached to the stop element 10 by means of a pin 28, where the pre-stressed flange 25 can rotate with respect to the pin 28. The pre-stressed flange 25 has a first standby position shown in FIG. 11, in which a spring 50 tenses the pre-stressed flange 25 so that the pre-stressed flange 25 remains in the standby position.

During the introduction of the stop element 10 in the housing 22, the pre-stressed flange 25 abuts with the contour of the entry opening 221 and leaves its standby position, tensing the spring 50, and rotating with respect to the pin 28, moving away from the exit opening 222 of the housing 22, thereby allowing the stop element 10 to be introduced in the housing 22. Once the first stop 43 in the form of a radial extension is housed in the hole 26, the pre-stressed flange 25 reaches the corresponding hole 27, the pre-stressed flange 25 returning to its standby position. When the pre-stressed flange 25 reaches its standby position, it is inserted into the hole 27, where the pre-stressed flange 25 cannot rotate beyond its standby position due to a projection 29 of the stop element 10, abutting against same during its rotating movement.

In the final assembly position, when the concrete is poured between both formwork panels, the concrete exerts pressure on the sealing gasket 11. However, the sealing gasket does not move as a result of the pressure because the first stop 23 and the second stop 24 of the stop element 10 abut with the edges of the holes 26 and 27, thereby preventing movement of the stop element 10.

In the vertical formwork 1 of the third embodiment, the stop element 10 abuts with the front formwork panel 2 in the final assembly position through the first stop 23 and the second stop 24, which prevent the stop element 10 from going beyond the exit opening 222 of the housing 22 once they are housed in the holes 26 and 27.

In the first embodiment, as shown in FIGS. 1 to 3, the rear anchor 5 of the vertical formwork 1 comprises a stop element 10' in which a second end of the tie rod 6 is introduced, the stop element 10' acting as a stop of the spacing tube 7 in the final assembly position. The rear anchor 5 further comprises an intermediate bushing 9' passed through by the tie rod 6 and which is arranged between the stop element 10' and the spacing tube 7. The intermediate bushing 9' comprises at one end a section 9a' which is housed in the spacing tube 7. The intermediate bushing 9' also comprises a perimetral ring 9b' after said section 9a', the spacing tube 7 being supported on a supporting surface of said perimetral ring 9b'. The other end of the intermediate bushing 9' is supported on the stop element 10'.

The assembly of the vertical formwork of this embodiment is simpler than the assembly of vertical formworks performed using a standard Dywidag® 15 or Dywidag® 20 tie, which are known in the prior art. In vertical formworks known in the prior art, the use of sealing cones on each side of the spacing tube made it easier for the tie rod to run into the rebar when the tie rod goes through the space between the two formwork panels given that the diameter of the tie rod was larger at those points where the sealing cones were arranged. However, as described above, in the vertical formwork 1 of the invention it is not necessary to use sealing cones on each side of the spacing tube 7, which makes it easier for the tie rod 6 to go through the rebar. The use of the intermediate bushing 9' in the vertical formwork 1 of the invention likewise allows the tie rod 6 to readily go through the rebar given that, as can be observed in FIG. 3, the substantially cylindrical shape and the dimensions thereof do not increase the diameter of the tie rod 6 at the point where the intermediate bushing 9' is arranged.

The following clauses encompass at least some of the aforesaid embodiments and additional embodiments.

Clause 1: A vertical formwork comprising at least:
- a front formwork panel (2) and a rear formwork panel (3) arranged facing one another,
- a threaded tie rod (6) which is fixed to both formwork panels (2, 3) in a final assembly position of the vertical formwork (1),
- a spacing tube (7) crossed by the tie rod (6) which is arranged between both formwork panels (2, 3) in the final assembly position,
- a front anchor (4) which fixes the tie rod (6) to the front formwork panel (2) in the final assembly position, and
- a rear anchor (5) which fixes the tie rod (6) to the rear formwork panel (3) in the final assembly position, the front anchor (4) comprising
- a nut (8) configured for being screwed onto a first end of the tie rod (6), and
- a stop element (10) crossed by the tie rod (6) and which is arranged between the spacing tube (7) and the nut (8), the stop element (10) acting as a stop of the spacing tube (7) when it is arranged in a final assembly position corresponding to the final assembly position of the vertical formwork (1), the vertical formwork (1) being configured for being assembled by means of introducing the tie rod (6) together with the spacing tube (7) and the stop element (10) through a through housing (22) of the front formwork panel (2) so as to fix the second end of the tie rod (6) to the rear anchor (5) previously placed in the rear formwork panel (3), the front anchor (4) then being fixed to the front formwork panel (2), where the tie rod (6) can swivel in the housing (22) during assembly, the stop element (10) being a tube swiveling in the housing (22) together with the tie rod (6) during assembly and indirectly abutting with the front formwork panel (2) when it reaches the final assembly position, such that the stop element (10) cannot move beyond its final assembly position.

Clause 2: The vertical formwork according to clause 1, comprising an intermediate bushing (9) crossed by the tie rod (6) and which is arranged between the stop element (10) and the spacing tube (7), the intermediate bushing (9) comprising at one end a section (9a) which is housed in the spacing tube (7), the intermediate bushing (9) also comprising a perimetral ring (9b) after said section (9a), the spacing tube (7) being supported on a supporting surface of said perimetral ring (9b) and the other end of the intermediate bushing (9) being supported on the stop element (10).

Clause 3: The vertical formwork according to clause 2, wherein the intermediate bushing (9) has a maximum outer diameter equal to or less than the outer diameter of the stop element (10), said intermediate bushing (9) preferably being substantially cylindrical along its entire length.

Clause 4: The vertical formwork according to any of clauses 1 to 3, wherein the stop element (10) comprises a sealing gasket (11) at its end adjacent to the spacing tube (7), the housing (22) of the front formwork panel (2) comprising an exit opening (222) and the sealing gasket (11) comprising a contour (11a) configured for sealing said exit opening (222) in the final assembly position, the sealing gasket (11) preferably comprising an annular portion (11b) configured for sealing the spacing tube (7).

Clause 5: The vertical formwork according to any of the preceding clauses, wherein the front anchor (4) comprises a dome plate (15) configured for fixing the tie rod (6) to the front formwork panel (2), the dome plate (15) comprising a through hole (16) delimited by a curved supporting surface (17), and the nut (8) comprising a curved complementary surface (18) configured for cooperating with the supporting surface (17) of the dome plate (15) like a ball and socket joint.

Clause 6: The vertical formwork according to clause 5, wherein the outer diameter of the stop element (10) is greater than the inner diameter of the through hole (16) of the dome plate (15).

Clause 7: The vertical formwork according to any of the preceding clauses, wherein the stop element (10) is attached to the nut (8) of the front anchor (4).

Clause 8: The vertical formwork according to clause 7, wherein the stop element (10) is fixed to the nut (8) of the front anchor (4) by means of threading and/or adhesive.

Clause 9: The vertical formwork according to clause 7, wherein the nut (8) of the front anchor (4) and the stop element (10) are a single piece.

Clause 10: The vertical formwork according to any of clauses 1 to 5, wherein the stop element (10) is attached to a stop plate (14) at its end adjacent to the nut (8) of the front anchor (4), the stop plate (14) being configured for being supported on the front formwork panel (2) in the final assembly position.

Clause 11: The vertical formwork according to clause 10, wherein the stop plate (14) is attached to the stop element (10) in a swiveling manner.

Clause 12: The vertical formwork according to clause 11, wherein the stop plate (14) comprises a through hole (19) configured for being crossed by the tie rod (6) and a curved supporting surface (20) surrounding the through hole (19), the stop element (10) comprising a contact surface (21) at its end adjacent to the nut (8) configured for cooperating with the supporting surface (20) of the stop plate (14) like a ball and socket joint.

Clause 13: The vertical formwork according to clause 12, wherein the stop plate (14) comprises a housing bushing (220) that is crossed by the stop element (10) and which delimits, together with the stop plate (14), a cavity in which the widened section of the stop element (10) is confined.

Clause 14: The vertical formwork according to any of clauses 1 to 5, wherein the stop element (10) is attached to a first stop (23) in the form of a radial extension and to a second stop (24) comprising a pre-stressed flange (25), the housing (22) comprising respective holes (26, 27) in which the first stop (23) and the second stop (24) are housed during assembly.

Clause 15: The vertical formwork according to any of the preceding clauses, wherein the rear anchor (5) comprises:
- a stop element (10') in which a second end of the tie rod (6) is introduced, the stop element (10') acting as a stop of the spacing tube (7) in the final assembly position, and an intermediate bushing (9') crossed by the tie rod (6) and which is arranged between the stop element (10') and the spacing tube (7), the intermediate bushing (9') comprising at one end a section (9a') which is housed in the spacing tube (7), the intermediate bushing (9') also comprising a perimetral ring (9b') after said section (9a'), the spacing tube (7) being supported on a supporting surface of said perimetral ring (9b') and the other end of the intermediate bushing (9') being supported on the stop element (10').

What is claimed is:

1. A vertical formwork comprising:
a front formwork panel having an inner face, an outer face and a through housing extending between the inner and outer faces;
a rear formwork panel having an inner face and an outer face, the inner face of the rear formwork panel facing the inner face of the front formwork panel;
a front anchor associated with the front formwork panel with a first portion of the first anchor being located adjacent the outer face of the front formwork panel in a final assembly position of the vertical formwork;
a rear anchor associated with the rear formwork panel with a first portion of the rear anchor being located adjacent the outer face of the rear formwork panel in the final assembly position of the vertical formwork;
a threaded tie rod having a first end portion coupled to the front anchor and a second end portion coupled to the rear anchor in the final assembly position of the vertical formwork;
a spacing tube passed through by the tie rod and arranged between the inner face of the front formwork panel and the inner face of the rear formwork panel in the final assembly position of the vertical formwork;
the front anchor comprising:
a nut configured for being screwed onto the first end portion of the tie rod to secure the tie rod to the front anchor; and
a tubular stop element passed through by the tie rod and being arranged between the spacing tube and the nut, the tubular stop element preventing a forward advancement of the spacing tube through the front formwork panel in the final assembly position of the vertical formwork, the tubular stop element not being in direct abutment with the front formwork panel in the final assembly position of the vertical formwork;
the vertical formwork being configured for being assembled by means of introducing the tie rod, the spacing tube and the tubular stop element as a unit through the through housing of the front formwork panel so as to facilitate a fixing of the second end portion of the tie rod to the rear anchor;
the tie rod, tubular stop element and through housing being configured to permit a swiveling of the tie rod and tubular stop element inside the through housing during the assembly of the vertical formwork and to permit a central longitudinal axis of each of the tie rod and tubular stop element to be non-concentric to a central longitudinal axis of the through housing of the front formwork panel when the front anchor is attached to the front formwork panel in the final assembly position of the vertical formwork.

2. The vertical formwork according to claim 1, further comprising an intermediate bushing passed through by the tie rod and which is arranged between the tubular stop element and the spacing tube, the intermediate bushing having a first end section that is housed in an inner cavity of the spacing tube, the intermediate bushing also including a radially protruding ring having a first end on which an end of the spacing tube is supported, the intermediate bushing having a second end section that is supported on the tubular stop element.

3. The vertical formwork according to claim 2, wherein the intermediate bushing has a maximum outer diameter equal to or less than the outer diameter of the tubular stop element.

4. The vertical formwork according to claim 3, wherein the intermediate bushing has a length and an outer surface having a circular profile along at least a portion of the length.

5. The vertical formwork according to claim 1, wherein the through housing of the front formwork panel has an entry opening and an exit opening, the vertical formwork further comprising a sealing gasket having a first end that engages with a portion of the tubular stop element, the sealing gasket comprising a contour configured to seal the exit opening in the final assembly position of the vertical formwork.

6. The vertical formwork according to claim 5, wherein the sealing gasket has a second end opposite the first end, the second end comprising an annular structure that is configured to press against an end portion of the spacing tube.

7. The vertical formwork according to claim 2, wherein the through housing of the front formwork panel has an entry opening and an exit opening, the vertical formwork further comprising a sealing gasket having a first end that engages with a portion of the tubular stop element, the sealing gasket comprising a contour configured to seal the exit opening in the final assembly position of the vertical formwork, the sealing gasket being located between the intermediate bushing and a portion of the through housing.

8. The vertical formwork according to claim 7, wherein the sealing gasket has a second end opposite the first end, the second end comprising an annular structure that is configured to press against an end portion of the spacing tube.

9. The vertical formwork according to claim 1, wherein the front anchor comprises a dome plate configured to fix the tie rod to the front formwork panel, the dome plate including a through hole delimited by a curved supporting surface, and the nut comprising a curved complementary surface configured to cooperate with the curved supporting surface of the dome plate to form a joint that functions like a ball and socket joint.

10. The vertical formwork according to claim 9, wherein the tubular stop element has an end located inside the dome plate, the end of the tubular stop plate having an outer diameter that is greater than an inner diameter of the through hole of the dome plate.

11. The vertical formwork according to claim 1, wherein the tubular stop element is attached to the nut of the front anchor.

12. The vertical formwork according to claim 11, wherein the tubular stop element is attached to the nut by threads and/or adhesive.

13. The vertical formwork according to claim 11, wherein the tubular stop element is attached to the nut by an adhesive.

14. The vertical formwork according to claim 11, wherein the nut and the tubular stop element are made from a single piece of material.

15. The vertical formwork according to claim 1, wherein an end of the tubular stop element is attached to a stop plate that is configured to rest against the outer face of the front formwork panel in the final assembly position of the vertical formwork.

16. The vertical formwork according to claim 15, wherein the stop plate is attached to the stop element in a swiveling manner.

17. The vertical formwork according to claim 16, wherein the stop plate includes a through hole configured for being passed through by the tie rod and a curved supporting surface surrounding the through hole, the stop element including a contact surface at an end adjacent to the nut configured for cooperating with the supporting surface of the stop plate to form a joint that functions like a ball and socket joint.

18. The vertical formwork according to claim 17, wherein the stop plate includes a housing bushing that is passed through by the tubular stop element and which delimits, together with the stop plate, a cavity in which a widened section of the stop element is confined.

19. The vertical formwork according to claim 1, wherein the tubular stop element is attached to a first stop in the form of a radial extension and to a second stop comprising a pre-stressed flange, the housing including first and second holes in which the first stop and the second stop are housed during assembly of the vertical formwork.

20. The vertical formwork according to claim 1, wherein the rear anchor comprises:
a tubular stop element passed through by the tie rod, the tubular stop element acting as a stop of the spacing tube in the final assembly position of the vertical formwork, and
an intermediate bushing passed through by the tie rod and which is arranged between the tubular stop element and the spacing tube, the intermediate bushing including a first end section that is housed in a cavity of the spacing tube, the intermediate bushing also including a radially protruding ring having a first end on which an end of the spacing tube is supported, the intermediate bushing having a second end section that is supported on the tubular stop element of the rear anchor.

* * * * *